United States Patent [19]

Martin

[11] Patent Number: 5,199,731
[45] Date of Patent: Apr. 6, 1993

[54] STEP ASSEMBLY FOR VEHICLES

[76] Inventor: Samuel K. Martin, United States Embassy, USAMRU P.O. Box 30137, Nairobi, Kenya

[21] Appl. No.: 799,435

[22] Filed: Nov. 26, 1991

Related U.S. Application Data

[63] Continuation-in-part of Ser. No. 600,832, Oct. 22, 1990, abandoned, which is a continuation-in-part of Ser. No. 577,023, Sep. 4, 1990, Pat. No. 5,137,294.

[51] Int. Cl.5 .............................................. B60R 3/02
[52] U.S. Cl. ............................. 280/166; 182/98; 182/127; 296/62
[58] Field of Search ............... 296/61, 62; 280/163, 280/166; 182/97, 98, 127

[56] References Cited

U.S. PATENT DOCUMENTS

| | | | |
|---|---|---|---|
| 3,572,753 | 3/1971 | Claassen | 280/166 |
| 3,608,957 | 9/1971 | Maneck | 296/146 |
| 3,751,068 | 8/1973 | Green | 280/166 |
| 3,912,299 | 10/1975 | Carr | 280/166 |
| 4,053,172 | 10/1977 | McClure | 280/163 |
| 4,062,582 | 12/1977 | Youmans | 296/190 |
| 4,116,457 | 9/1978 | Nerem et al. | 280/166 |
| 4,139,078 | 2/1979 | Keller | 280/166 X |
| 4,200,303 | 4/1980 | Kelly | 280/166 |
| 4,412,686 | 11/1983 | Fagrell | 280/166 |

FOREIGN PATENT DOCUMENTS 385773 9/1973 U.S.S.R. ............................. 280/166

Primary Examiner—Russell D. Stormer
Assistant Examiner—Andrew C. Pike
Attorney, Agent, or Firm—Nixon & Vanderhye

[57] ABSTRACT

A step assembly (438) includes two step supporting members (444) which have proximal ends pivotally attached to the underside of a mounting bracket (440). The step supporting members (444) support a plurality of rungs (445). A step plate (446) is attached in cantilevered manner to each of the rungs (445) whereby a rear one of the step supporting members (444) is intermediate the step plate (446) and the front step supporting member. A transmission assembly is provided for causing distal ends of the step supporting members to contact the ground (G) and thereby acquire an extended, angularly inclined position. In one embodiment, the transmission assembly includes an actuator (470). In another embodiment, the transmission assembly includes a motor and cable assembly (472).

8 Claims, 11 Drawing Sheets

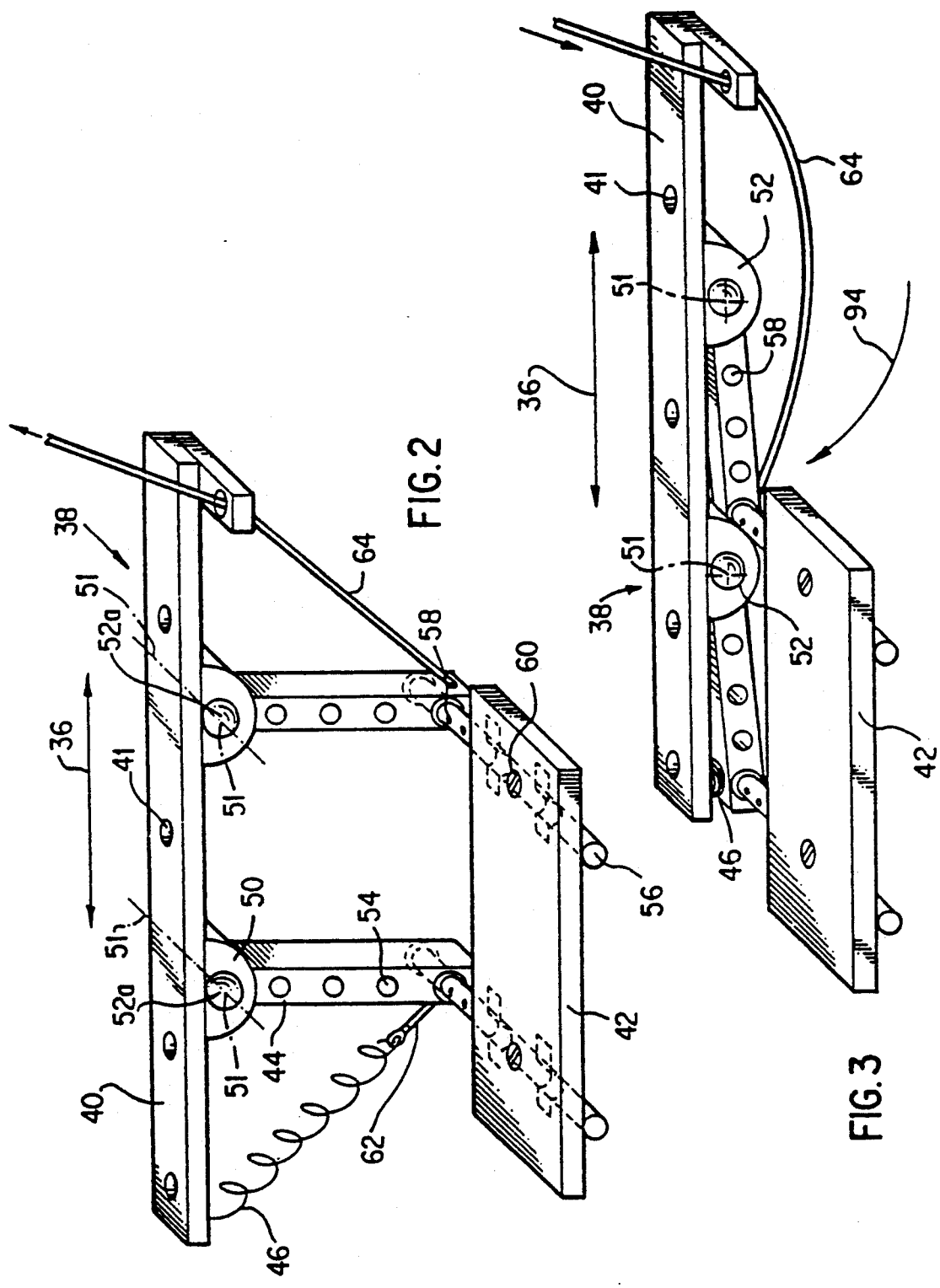

STEP ASSEMBLY FOR VEHICLES

This application is a continuation-in-part application of U.S. patent application Ser. No. 07/600,832 filed Oct. 22, 1990, now abandoned, which in turn is a continuation-in-part application of U.S. patent application Ser. No. 07/577,023 filed Sep. 4, 1990, now U.S. Pat. No. 5,137,294.

BACKGROUND

1. Field of Invention

This invention pertains to a step apparatus for vehicles, and particularly to a step apparatus which facilitates ingress and egress from vehicles with high ground or road clearance.

2. Prior Art and Other Considerations

Numerous types of vehicles have high ground clearance, for reasons ranging from the sheer size of the vehicle to desirability of roving over rugged terrain. For example, large trucks which haul freight have truck beds which are, by necessity, considerably elevated from the ground in view of the truck size. Other types of vehicles, such as recreational vehicles (RVs), although generally midsized, are deliberately elevated to enable the vehicles to travel off-road.

In recent years recreational vehicles (RVs) and light trucks have been sold in increasing numbers. These vehicles are now being used not just for light hauling and off-road trips, but also for commuting and general transportation purposes. The drawback of having high road clearance for RVs is that embarking and disembarking the vehicle presents difficulty for certain passengers most notably the elderly, the infirm, children, and women wearing tight fitting skirts or gowns.

Previous attempts to overcome the problem of ingress and egress into vehicles having high ground clearance fall into two basic categories: permanent steps and retractable steps. The first type of step has limited effectiveness since the closer the step gets to the ground the more the vehicle road clearance is compromised.

The second type of step, the retractable step, also has certain drawbacks. An example of a retractable step is shown in U.S. Pat. No. 3,751,068 to Green, wherein the step extends down and out by a cable attached to the hinged end of a door. The Green patent does not disclose any way of adjusting the height or the number of steps. Furthermore, since the device patented by Green can only be used with vehicles which have hinged doors, it is not possible to use the device with sliding door vehicles. Finally, by attaching the cable to the hinged end of the door, the Green device has only limited energy available for extending the step since the distance of displacement of the cable is minimal.

U.S. Pat. No. 3,608,957 (Maneck) shows a horizontal running board for vehicles with sliding doors. The Maneck running board extends outwardly horizontally by the movement of the door. The Maneck device cannot be readily adapted for use with hinged doors. Maneck also does not disclose any way of adjusting the number and height of the steps.

U.S. Pat. No. 3,572,753 to Claassen shows a sole outwardly-angled arm which has an oblique orientation of approximately 45° to a horizontal frame bar.

U.S. Pat. No. 4,062,582 to Youmans discloses spaced support arms which are not spaced in relation to the longitudinal horizontal axis of the vehicle.

SUMMARY OF THE INVENTION

Accordingly, it is an object of the present invention to provide an improved step for boarding vehicles of the type having high ground clearance.

An advantage of the present invention is to provide an improved step for boarding vehicles which can be used with both sliding and hinged doors.

A further advantage of the present invention is the provision of an improved step apparatus where the number and height of the steps are adjustable.

A further advantage of the present invention is the provision of embodiments of an improved retractable step assembly which translates energy used or produced in the act of opening and/or closing a vehicle door into energy for operating the retractable step assembly.

A further advantage of the present invention is the provision of embodiments of an improved retractable step assembly which uses an electric motor for operation.

Yet another advantage of the present invention is the provision of embodiments of an improved retractable step assembly suitable for ingress and egress at the rear of a vehicle.

A step apparatus is provided for vehicles having a high ground/road clearance. In some embodiments, the step apparatus is door-position responsive, i.e., responsive to the opening and closing of a vehicle door. In other embodiments, the step apparatus provides an inclined ladder-like arrangement of step plates for facilitating ingress and egress.

Door-position responsive embodiments of the step apparatus are utilizable with either a hinged door or a sliding door. Such apparatus includes two step supporting members pivotally attached to the underside of the vehicle for adjustably supporting a step or plurality of steps. The proximal ends of the step supporting members are spaced apart along a longitudinal vehicle axis. At least one of the step supporting members is pivotal about a horizontal axis which is perpendicular to vehicle axis. Opening the vehicle door causes the step assembly to pivot about an axis perpendicular to the longitudinal horizontal axis of the vehicle, thereby extending the step assembly for facilitating easy boarding of the vehicle.

In some door-position responsive embodiments, transmission means include a cable which has a first end attached to the locking end of the door and a second end attached to a front one of the supporting members. The cable is at least partially disposed within a hollow cord which extends through portions of the vehicle frame.

In another door-position responsive embodiment, a cable has a first end attached to an electric motor and a second end attached to one of the supporting members. A switch, responsive to the position of the door, actuates the motor for extension and retraction of the step assembly.

In some door-position responsive embodiments, a biasing member is used to bias the supporting members and attached step to a retracted position beneath the vehicle.

In the inclined ladder embodiments, two step supporting members have proximal ends pivotally attached to the underside of a mounting bracket. The step supporting members support a plurality of rungs. A step plate is attached in cantilevered manner to each of the rungs whereby a rear one of the step supporting members is between the step plate and the front step supporting member.

The inclined ladder step embodiments also include transmission means for causing distal ends of the step supporting members to contact the ground and thereby acquire an extended, angularly inclined position. In one embodiment, the transmission means includes an actuator. In another embodiment, the transmission means includes a motor and cable assembly.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2 is an isometric side view of the step assembly of FIG. 1 in an extended position.

FIG. 3 is an isometric side view of the step assembly of FIG. 1 in a retracted position.

DETAILED DESCRIPTION OF THE DRAWINGS

Figure 1:
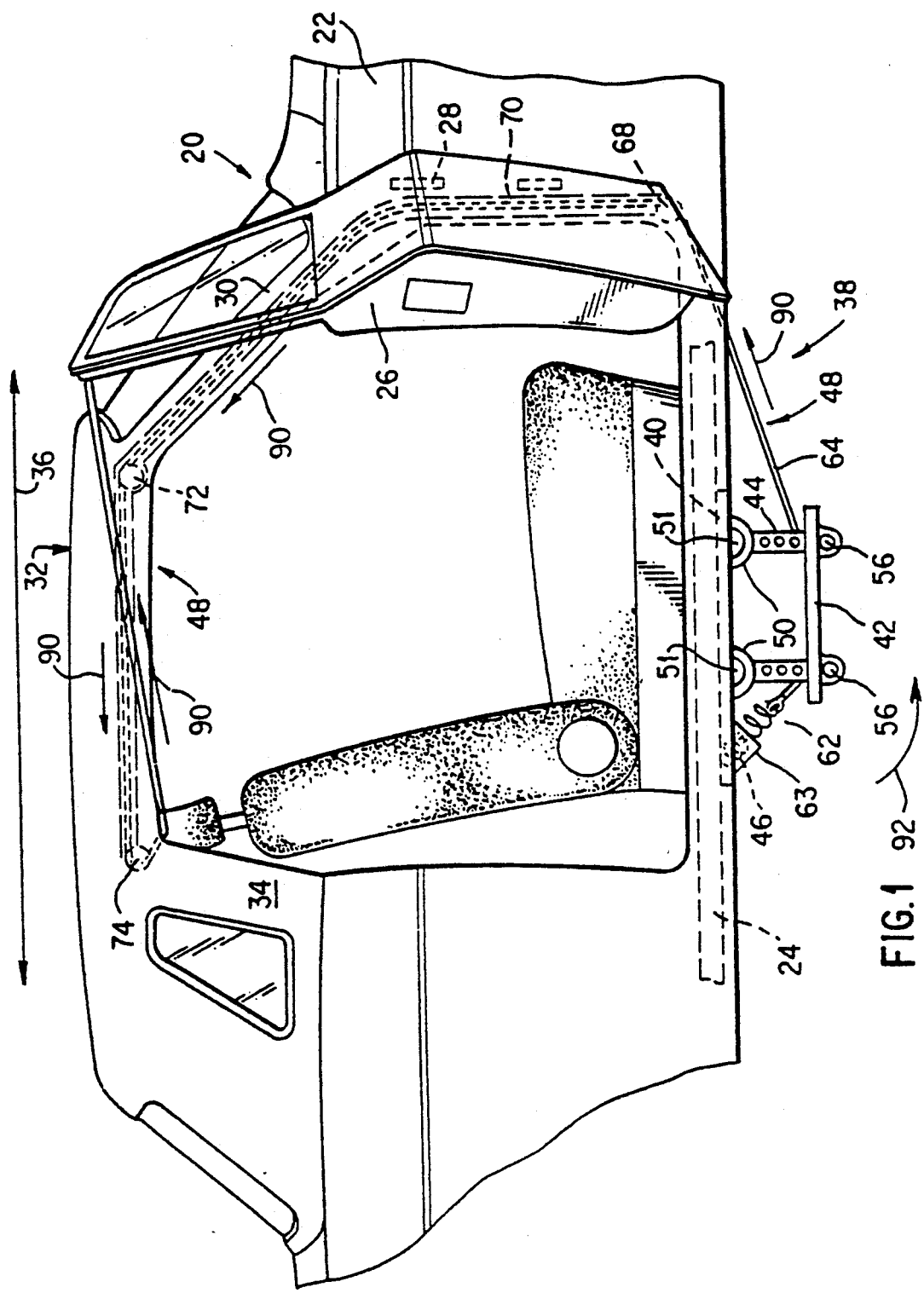
FIG. 1 is a side view of a hinged door vehicle having a step assembly of a first embodiment of the invention mounted thereon.

FIG. 1 shows a recreational vehicle 20 having a vehicle body 22 and a vehicle undercarriage 24. The vehicle body includes a door 26 hinged to the body 22 by hinges 28. Around the vehicle door 26, the vehicle body 22 further includes a windshield post 30; a top 32; and a center post 34. The vehicle 20 has a longitudinal horizontal axis from its front to its rear, which axis is depicted by the arrow 36.

A step assembly 38 of the embodiment of FIG. 1 includes a mounting bracket 40; a step or platform 42; step supporting members 44 or rails pivotally attached to the mounting bracket 40; step assembly biasing means 46; and transmission means including cable assembly 48.

The mounting bracket 40 is a rectangular plate which is secured to the vehicle undercarriage 24. The mounting bracket 40 can be secured to vehicle undercarriage 24 by any suitable means such as welding, fastening, or clamping. In the illustrated embodiment, apertures 41 are provided for fastening the bracket 40 to the vehicle undercarriage 24.

Figure 4:
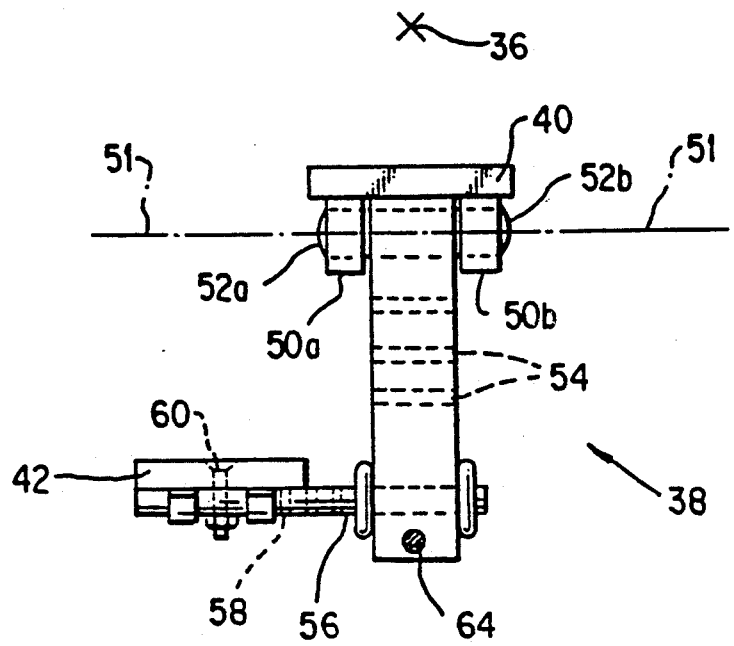
FIG. 4 is a front view of the step assembly of FIG. 2.

The underside of mounting bracket 40 has two pairs of depending semi-circular rings 50 formed therebeneath. The pairs of rings 50 are displaced from one another along the direction of axis 36 by a distance which is on the order of the length of the step 42. Within each pair of rings 50, an outer ring 50a is positioned closer to the step 42 in the sense of the width of the bracket 40 (e.g., in the sense of a transverse or width axis 51 of the vehicle 20), as seen in FIG. 4.

Two step supporting members 44 are provided. The step supporting members 44 each have proximal ends which bear projections 52. In this regard, the proximal end of each step supporting member has a first projection 52a which extends transversely toward the step 42 and second projection 52b which extends toward a centerline of the vehicle 20. A bearing sleeve or other friction reducing means is provided in each ring 50 to provide smooth pivoting action about axis 51. Accordingly, the step supporting members 44 pivotally depend about the rings 50 on mounting bracket 40.

The proximal ends of the step supporting members 44 are thus spaced apart (i.e., are in spaced relation) along the axis 36. Each step supporting member 44 is pivotal about a horizontal axis 51 which is perpendicular to axis 36. The axis 51 about which each step supporting member pivots extends through the projections 52 provided at the proximal ends of the members 44.

The step supporting members 44 also have a plurality of evenly spaced apertures 54 for securing at least one step 42 to the step supporting members 44. The apertures 54 are provided so that the height of the step 42 relative to the ground is adjustable. In addition, the apertures 54 permit the inclusion of further steps should such be desirable.

The step 42 lies in an essentially horizontal plane. The step 42 has a pair of cylindrical support arms 56 attached to the underside thereof. The support arms are spaced apart relative to the length of the step (e.g., in the sense of arrow 36) at a distance on the order of the separation between centerlines of the supporting members 44. Each support arm 56 has an end adapted for insertion into a selected one of the apertures 54 provided in its corresponding step supporting member 44. In this respect, apertures 54 are provided with bearing sleeves or other friction reducing means so that the support arms 56 can rotate within the apertures 54.

The support arms 56 also have a plurality of apertures 58 extending diametrically therethrough. A selected one of the apertures 58 receives a fastener 60 which extends through the step 42 for securing the step 42 to the support arm 56. The provision of a plurality of apertures 58 facilitates positional adjustment of the step 42 relative to width of the vehicle body (e.g., transverse to the direction of arrow 36). Thus, the user can adjust the step 42 so as to provide a desired clearance from the vehicle.

The step assembly biasing means 46 is securely fastened to the mounting bracket 40. The biasing means 46 includes a tightly coiled spring, a first end of which is anchored to the mounting bracket 40 and a second end of which is connected to a first length of cable 62. The coiled spring is located in a housing 63.

The first length of cable 62 is connected to a distal portion of the rear step supporting member 44. As will be seen below, the biasing means 46 urges the step supporting members 44 to a retracted position (shown in FIG. 3) beneath the vehicle body 22 by causing the step supporting members 44 to pivot about an axis which is perpendicular to the longitudinal axis 36 of the vehicle 20.

Referring again to FIG. 1, the transmission cable assembly 48 includes a second length of cable 64 which has a first end attached to the front step supporting member 44. The cable 64 travels through an aperture in the vehicle body 22 to and around a first pulley 68. The first pulley 68 changes the orientation of the cable 64 so that cable 64 acquires an essentially vertical orientation. After the cable 64 passes over the first pulley 68, it is threaded through a hollow cord 70. The hollow cord 70 is secured to or within the vehicle body 22 so as to remain stationary relative to the cable 64.

The cable 64 travels substantially vertically past the vehicle door 26 through the windshield post 30 to a second pulley 72. The second pulley 72 changes the orientation of the cable 64 so that cable 64 now acquires an essentially horizontal orientation along the top 32 of the vehicle 20. The cable 64 is horizontally disposed along or within the vehicle top 32 until it passes through an aperture 74 in the vehicle top. The second end of the cable 64, which extends through the aperture 74, is attached to the non-hinged edge of the vehicle door 26, i.e., the end of the door which engages the vehicle centerpost 34.

Figure 5:
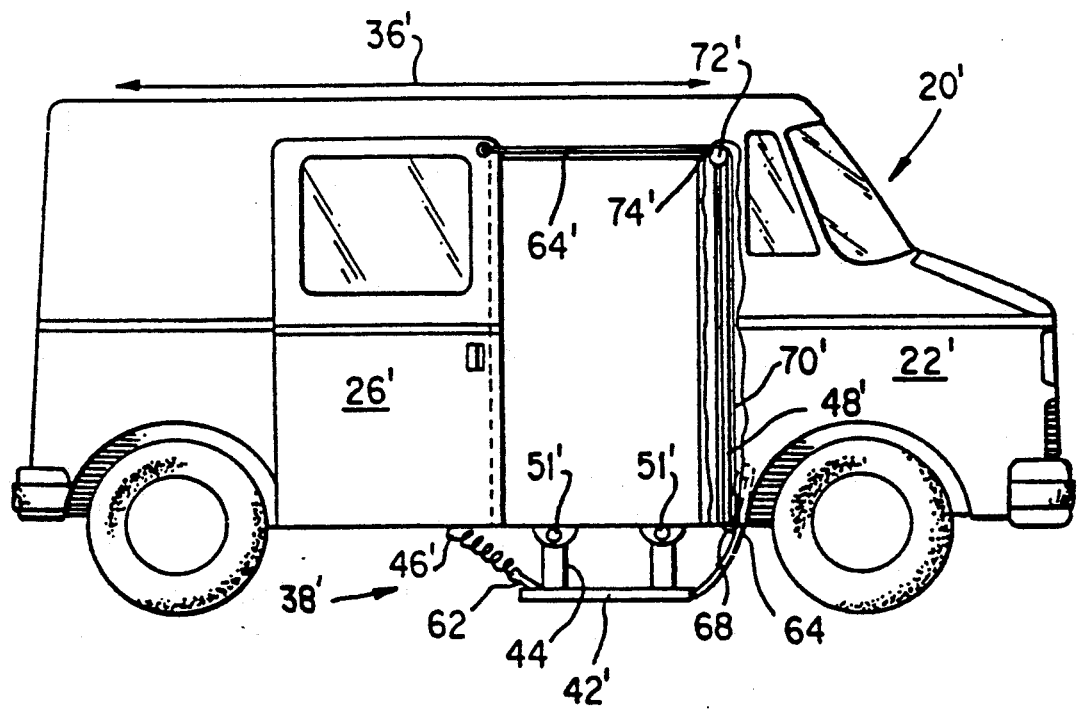
FIG. 5 is a side view of a sliding door vehicle having a step assembly of a second embodiment of the invention mounted thereon.

The step assembly 38, of the embodiment of FIG. 5 differs from the embodiment of FIG. 1 in the manner in which the transmission cable assembly is positioned relative to the vehicle. In this regard, FIG. 5 shows a sliding door vehicle 20' having a sliding door 26'. A cable 64' is attached to the step supporting member 44' which is nearest the front of the vehicle 20'. The cable 64' passes over a first pulley 68'; travels through hollow cord 70'; and passes over a second pulley 72'. The cable passes through aperture 74' and is connected to the vehicle door 26'.

Figure 6:
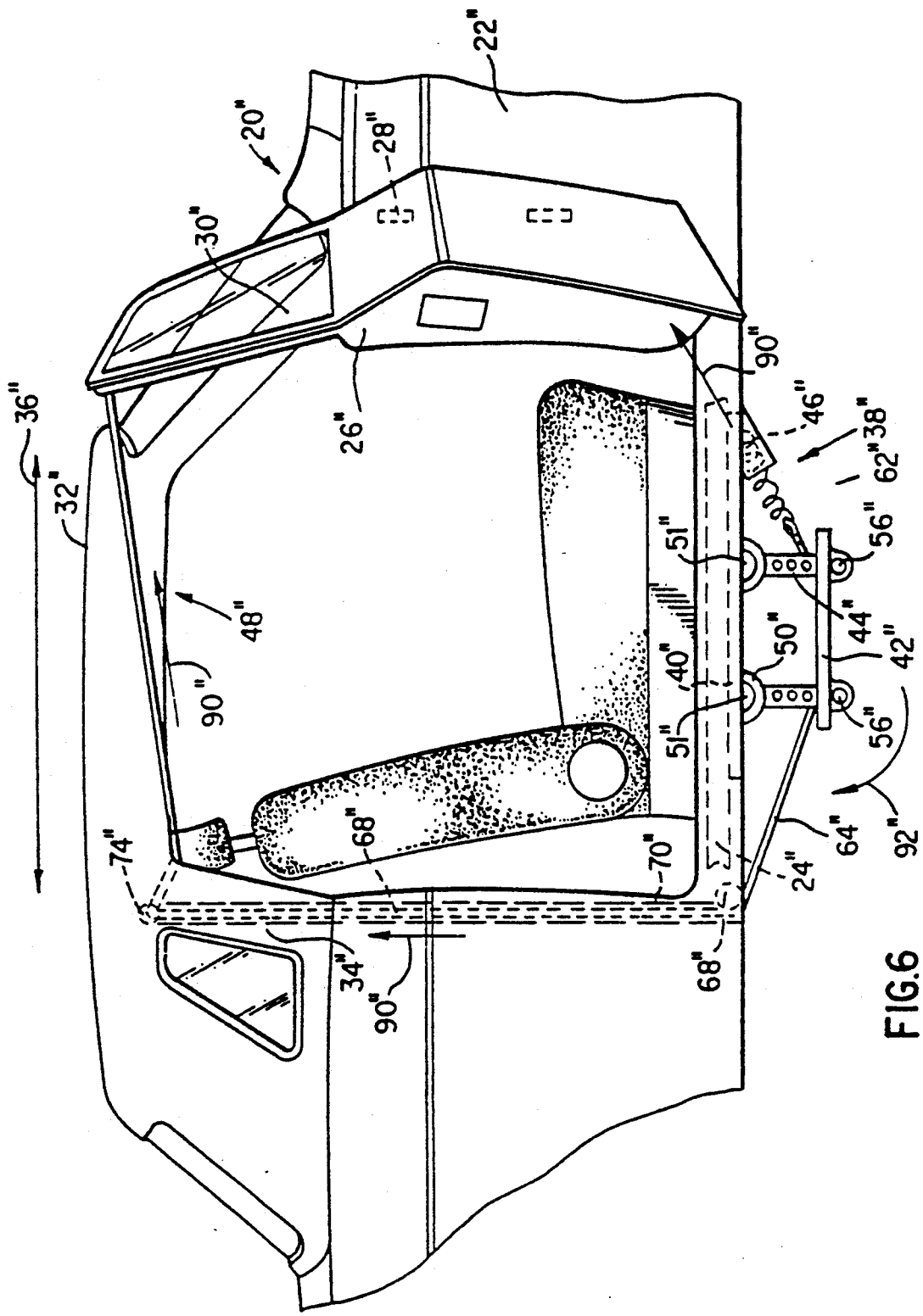
FIG. 6 is a side view of a hinged door vehicle having a step assembly of a third embodiment of the invention mounted thereon.

The step assembly 38" of the embodiment of FIG. 6 also differs from the embodiment of FIG. 1 in the manner in which the transmission cable assembly is positioned relative to the vehicle. In this regard, FIG. 6 also shows a hinged door 26" of a vehicle 20". The step assembly 38" of the embodiment of FIG. 6 has its biasing means 46" positioned beneath a front portion of the mounting bracket 40", rather than beneath a rear portion thereof as occurs in FIG. 1. The first length of cable 62" is connected from the biasing means 46" to the front supporting member 44". The rear supporting member 44" has a first end of the second length of cable 64" connected thereto. The second length of cable 64" extends about pulley 68" up through the center post 34" of the vehicle 20"; about pulley 74"; and has its second end connected to the top corner of the locking end of the door 26". Portions of the cable 68" extend through a hollow cord 70".

Figure 7:
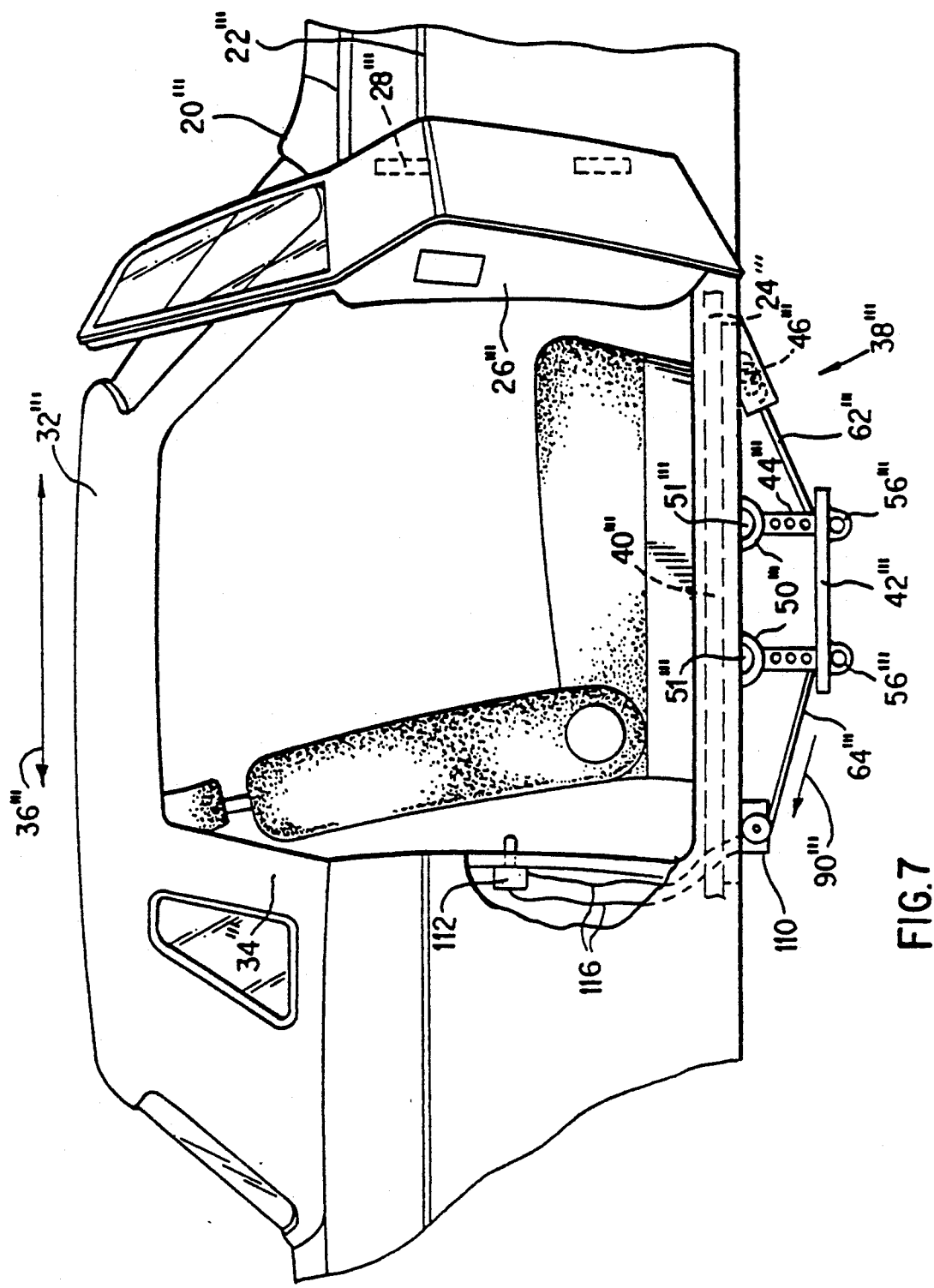
FIG. 7 is a side view of a hinged door vehicle having a step assembly of a fourth embodiment of the invention mounted thereon.

The step assembly 38'" of the embodiment of FIG. 7 differs from the embodiment of FIG. 6 in the manner in which the force is produced to extend the step assembly 38'". In this regard, FIG. 7 also shows a hinged door vehicle 20'". The embodiment of FIG. 7 obviates the extension of a transmission cable through the body 22'" of the vehicle, and instead connects the cable 64'" to an electric motor 110 or other force generating device attached to the rear portion of the mounting bracket 40'". The electric motor 110 can contain its own battery, be connected to the battery of the vehicle 20'", or be otherwise powered.

The electric motor 110 or other force producing device is securely fastened to the mounting bracket 40'". One end of the cable 64'" is coupled to the output shaft of the motor 110 and the other end of cable 64'" is coupled to the rear step supporting member 44'".

A switch 112 is attached to the center post 34'" of the vehicle 22'". In the illustrated embodiment, the switch 112 is positioned so that closure of the door 26'" causes the switch to be held in an "off" position for deactivating or reversing the motor 110. Switch 112 is connected to motor 110 by electrical wires 116. It should be understood that the motor-driven embodiment of the step assembly 38'" can be employed with a sliding door vehicle as well as with a swinging or hinged door vehicle.

Figure 8:
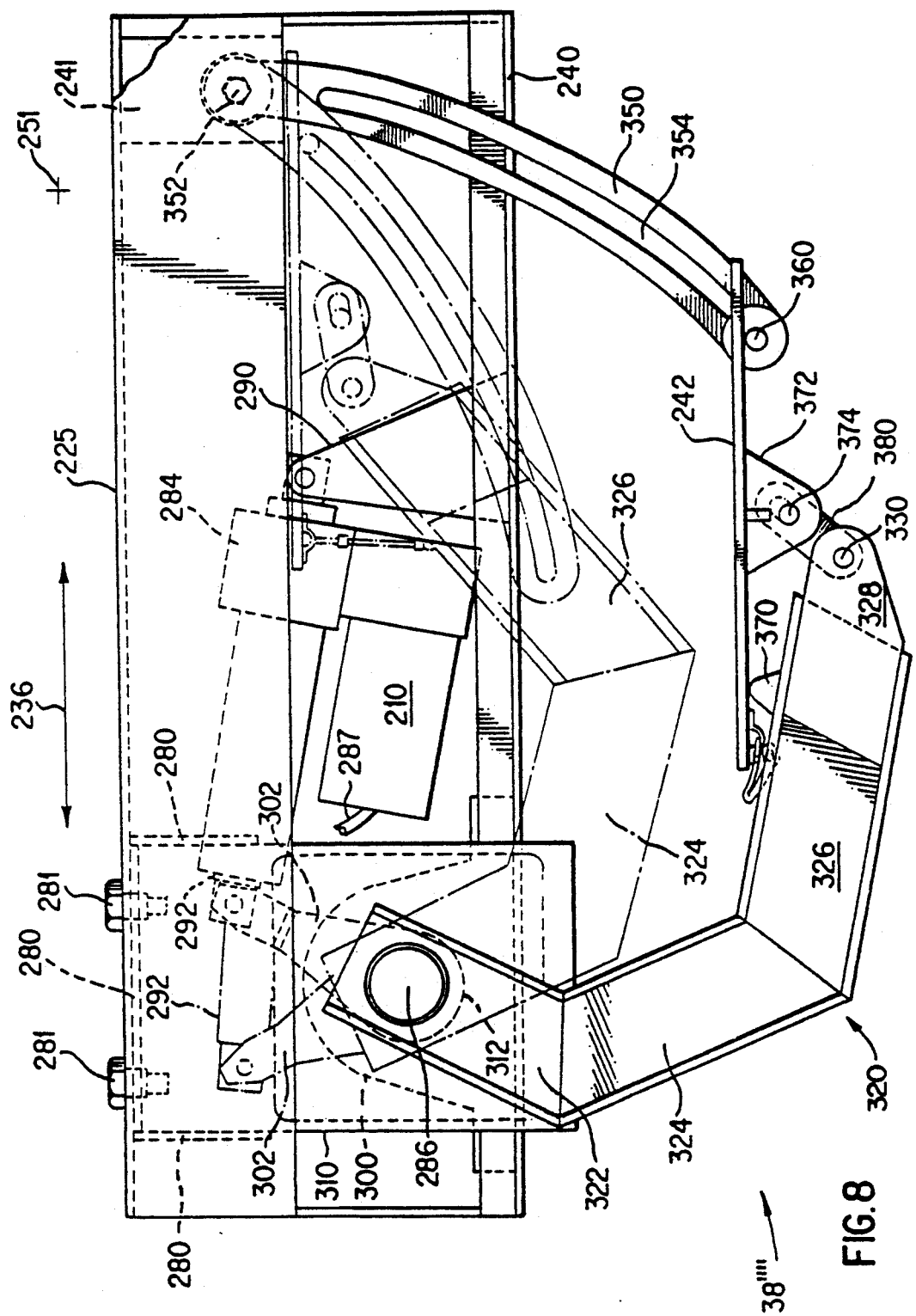
FIG. 8 is a side view of a step assembly according to a fifth embodiment of the invention.
Figure 9:
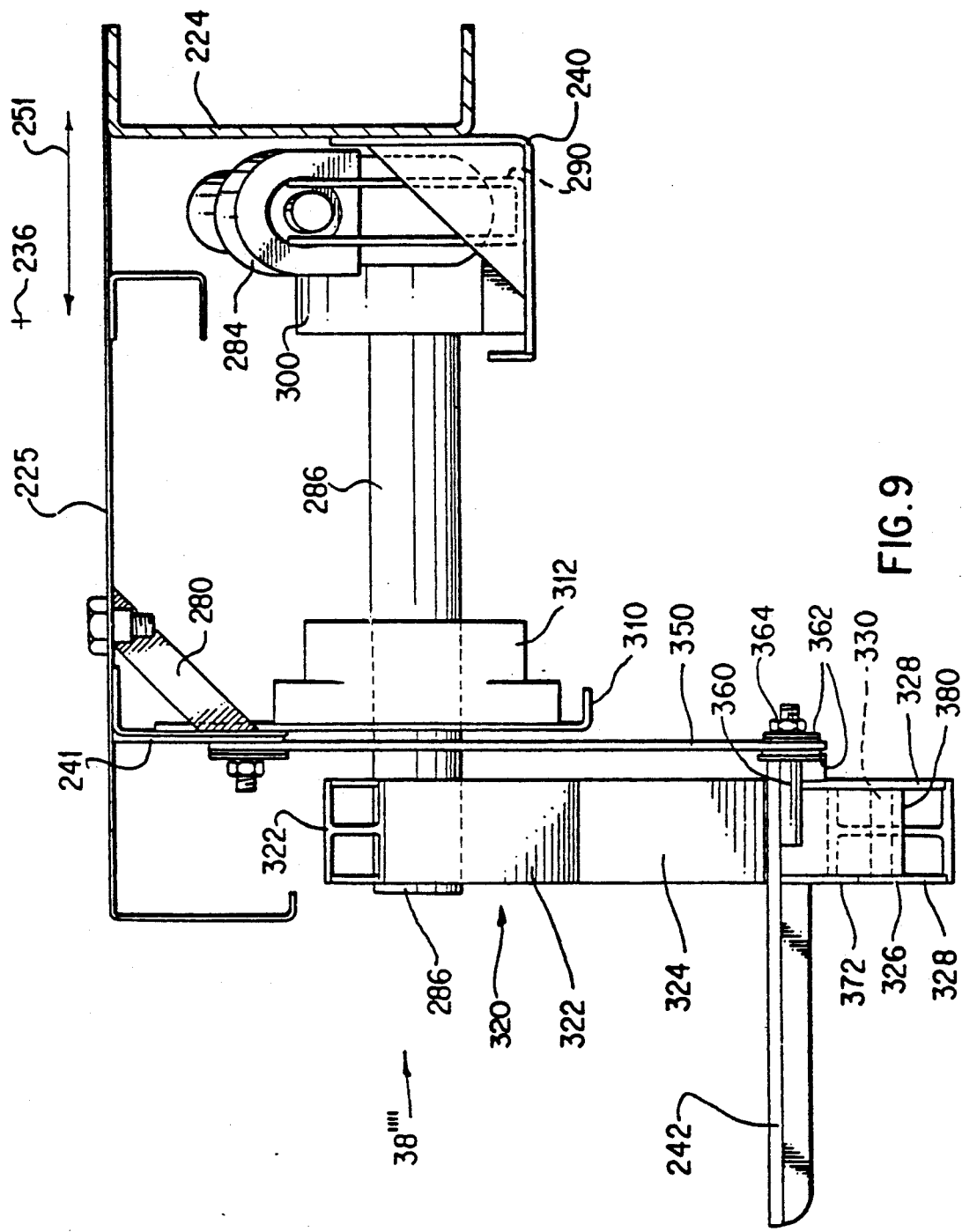
FIG. 9 is a front view of the step assembly of FIG. 8.

The step assembly 38"" of the embodiment of FIGS. 8 and 9 can be used with either a hinged or sliding door vehicle. Like the embodiment of FIG. 7, the step assembly 38"" of FIGS. 8 and 9 is electrically actuated.

FIGS. 8 and 9 do not show vehicle structure except for a vehicle undercarriage 224 and a floorboard 225. In this regard, it is understood in FIGS. 8 and 9 that the vehicle has a longitudinal axis depicted by arrow 236 (perpendicular to the plane of the sheet of FIG. 9) and a width axis depicted by arrow 251 (perpendicular to the plane of the sheet of FIG. 8).

The step assembly 38"" has a mounting bracket means which includes an undercarriage mounting bracket 240 and a floorboard mounting bracket 241. The undercarriage mounting bracket 240 has an essentially U-shaped channel cross section (see FIG. 9) facing upwardly to the underside of the floorboard 225. The undercarriage mounting bracket 240 and the floorboard mounting bracket 241 are welded or otherwise affixed to the undercarriage 224 and underside of the floorboard 225, respectively. In addition, the floorboard mounting bracket 241 is mounted by an inverted brace 280 to the underside of the floorboard 225. The brace 280 is secured to the underside of the floorboard by fasteners 281.

The undercarriage mounting bracket 240 carries transmission means and force producing means in its channel. In this respect, the undercarriage mounting bracket 240 carries an electrical actuator 284 (which includes an electric motor 210) and a first end of transmission shaft 286. The electric motor 210 is connected by electrical wiring 287 to a door switch, such as door switch 112 of a previously described embodiment.

The electrical actuator 284 is mounted on the undercarriage mounting bracket 240 by an actuator support 290 (see FIG. 9). The electrical actuator 284 includes an extendable piston 292. FIG. 8 shows the piston 292 both in its retracted and extended (phantom) positions.

The undercarriage mounting bracket 240 also carries a pillow block bearing 300 through which a first end of the transmission shaft 286 rotatably extends. The first end of the transmission shaft 286 extends just slightly beyond the pillow block 300, and is connected to the extendable piston 292 of actuator 284 by a yoked crank 302.

The floorboard mounting bracket 241 has a flanged bracket 310 depending therefrom. A bearing 312 is mounted to the rear of the bracket 310. The bracket 310 has an aperture provided therein so that the second end of the transmission shaft 286 rotatably extends through the bearing 312 and the bracket 310.

A step supporting member 320 is attached to the second end of the transmission shaft 286 protruding from the floorboard mounting bracket. The step supporting member 320 is crooked to have a configuration of three angled segments, particularly proximate segment 322, intermediate segment 324, and distal segment 326. At its distal extremity, the distal segment 326 of the step supporting member 320 has two spaced-apart ears 328 which carry a pivot rod 330 therebetween.

The floorboard mounting bracket 241 also carries another step supporting member, particularly step supporting member 350. The step supporting member 350 is in the form of a slide. A proximal end of the step supporting member 350 is pivotally attached to the floorboard mounting bracket 241 so that the member 350 pivots about axis 352 (which is perpendicular to the longitudinal axis 236).

The step supporting member 350 is elongated and slightly arcuate in shape. The step supporting member 350 has an elongated arcuate aperture 354 centrally provided therein. A shaft 360 extends with sliding clearance through the aperture 354 in an orientation whereby the axis of shaft 360 is parallel to the axis 352. Two washers 362 provided on shaft 360 trap the step supporting member 350 therebetween. A hex nut 364 is also provided on the shaft 360.

The step assembly 38'''' has a step 242 which lies in an essentially horizontal plane. Near a front portion thereof, an underside of the step 242 has the shaft 360 welded thereto. In describing the step 242, the "front" is toward the front of the vehicle (e.g., to the right of FIG. 8). A rear portion of the step 242 is supported by a crest 370 formed on the distal segment 326 of the step supporting member 320.

Near an intermediate portion of its underside, the step 242 has two inverted, triangularly shaped brackets 372 depending therefrom. The brackets 372 are spaced apart and carry a pivot pin 374 therebetween.

A step attachment bar 380 connects the step 242 to the step supporting member 320. The step-attachment bar 380 has pivot pin 374 extending through a front aperture and the pivot rod 330 carried by the step supporting member 320 extending through a rear aperture thereof.

It should be understood that the mounting bracket means acquires different configurations depending on the particular vehicle with which the step assembly 38'''' is employed. Thus, in another embodiment the mounting bracket means is of unitary construction, rather than two separate members.

Figure 10:
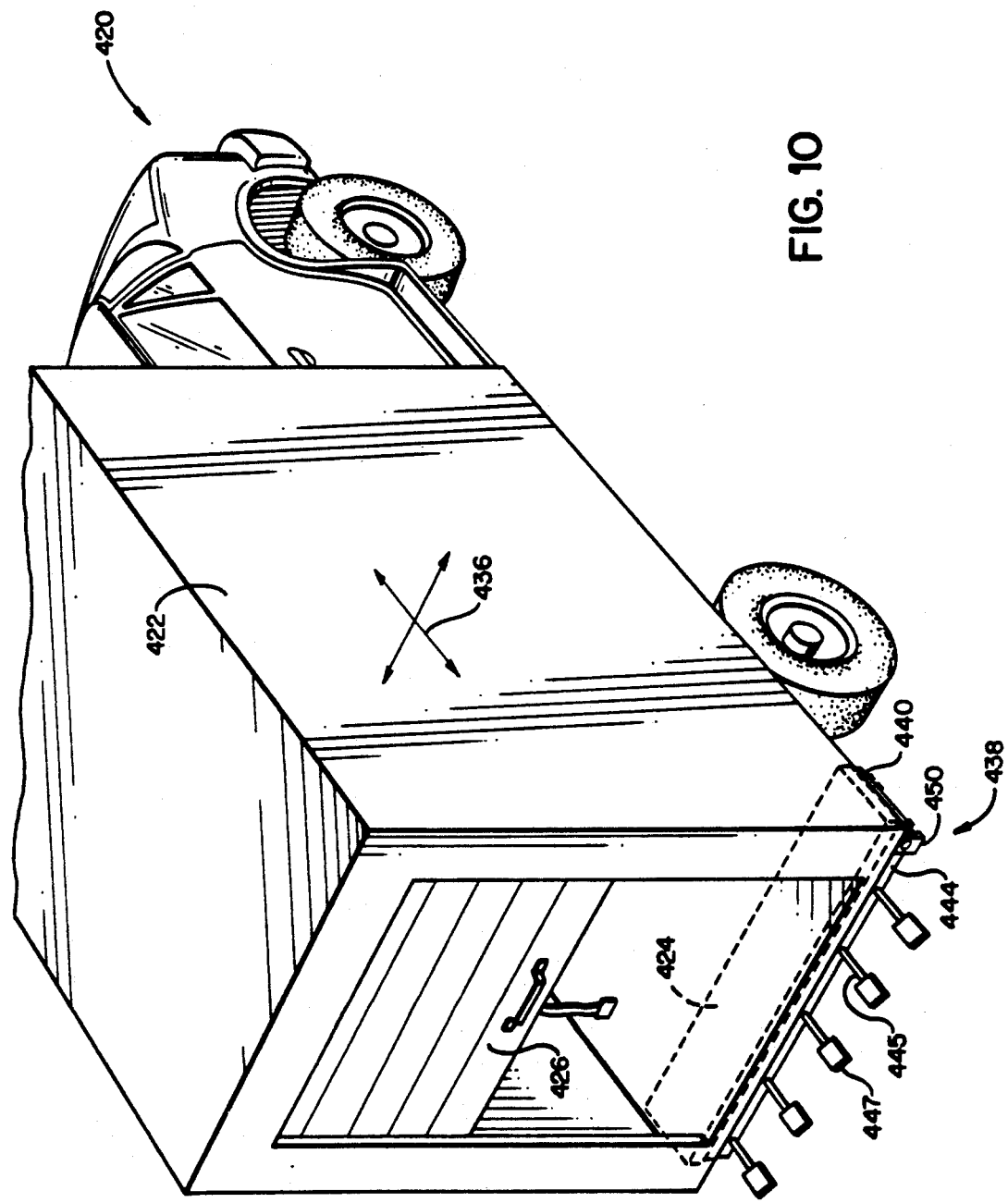
FIG. 10 is an isometric side view of a vehicle having a step assembly according to the sixth embodiment of the invention, with the step assembly mounted at the rear of the vehicle and being in a retracted position.
Figure 11:
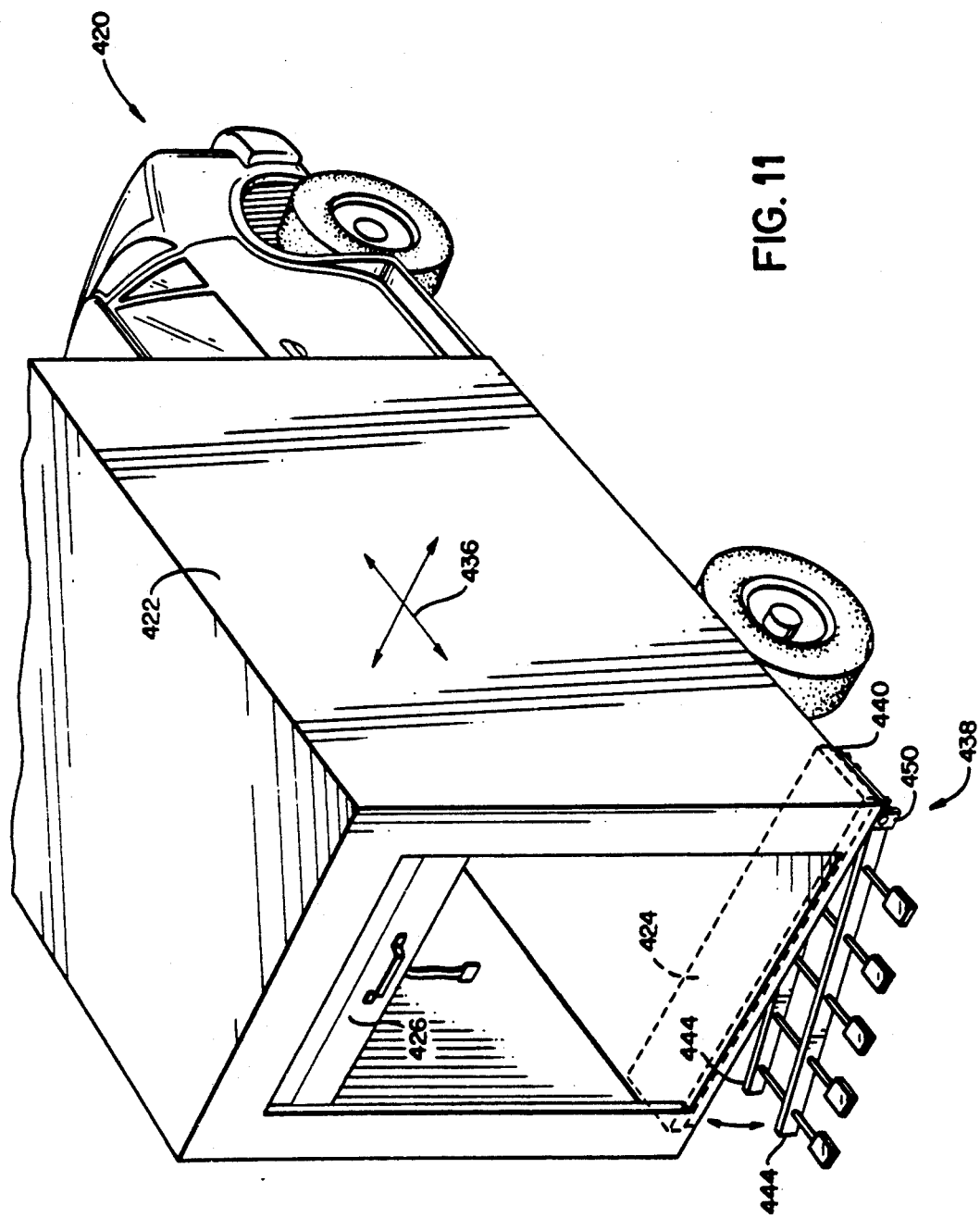
FIG. 11 is an isometric side view of the vehicle having the step assembly of the embodiment of FIG. 10, but with the step assembly being in an extended position.

FIGS. 10 and 11 show an inclined ladder-type embodiment of a step assembly. FIG. 10 shows a vehicle 420 having a vehicle body 422 and a vehicle undercarriage 424. The vehicle body 422 includes a rear door 426. The vehicle 420 has a longitudinal horizontal axis from its front to its rear, which axis is depicted by the arrow 436.

A step assembly 438 of the embodiment of FIG. 10 includes a mounting bracket 440; two step supporting members 444; a plurality of rungs 445; and a step plate 447 attached in cantilevered manner to each of the rungs 445.

The mounting bracket 440 is a rectangular plate which is secured to the vehicle undercarriage 424. As with the previously described embodiments, the mounting bracket 440 can be secured to vehicle undercarriage 424 by any suitable means such as welding, fastening, or clamping.

The underside of mounting bracket 440 has two pairs of depending semi-circular rings 450 formed therebeneath. The pairs of rings 450 are displaced from one another along the direction of axis 436 by a distance which is on the order of the width of the step supporting members 444.

As indicated above, two step supporting members 444 are provided. As used herein, the step supporting member which is closest to the front of the vehicle is referred to as the front step supporting member, while the step supporting member which is farthest from the front of the vehicle is referred to as the rear step supporting member.

The step supporting members 444 each have T-shaped proximal ends with projections 452 which fit into the rings 450 depending from the mounting bracket 440. A bearing sleeve or other friction reducing means is provided in each ring 450 to provide smooth pivoting action about axis 451. Accordingly, the step supporting members 444 pivotally depend about the rings 450 on mounting bracket 440.

The proximal ends of the step supporting members 444 are thus spaced apart (i.e., are in spaced relation) along the axis 436. Each step supporting member 444 is pivotal about the horizontal axis 451 which is parallel to axis 436. The axis 451 about which each step supporting member 444 pivots extends through the projections 452 provided at the proximal ends of the members 444.

Figure 13:
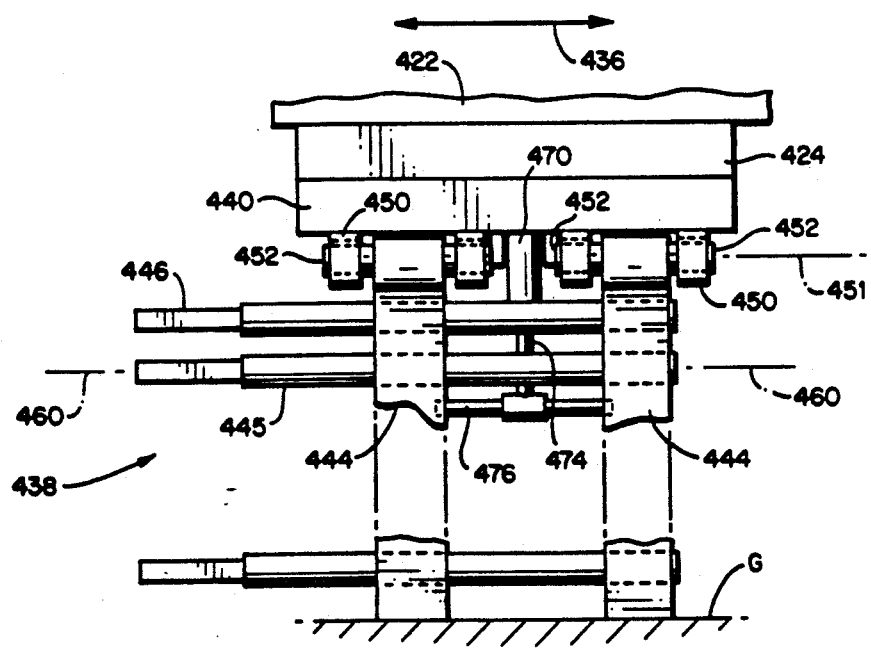
FIG. 13 is a right side view of FIG. 12.
Figure 15:
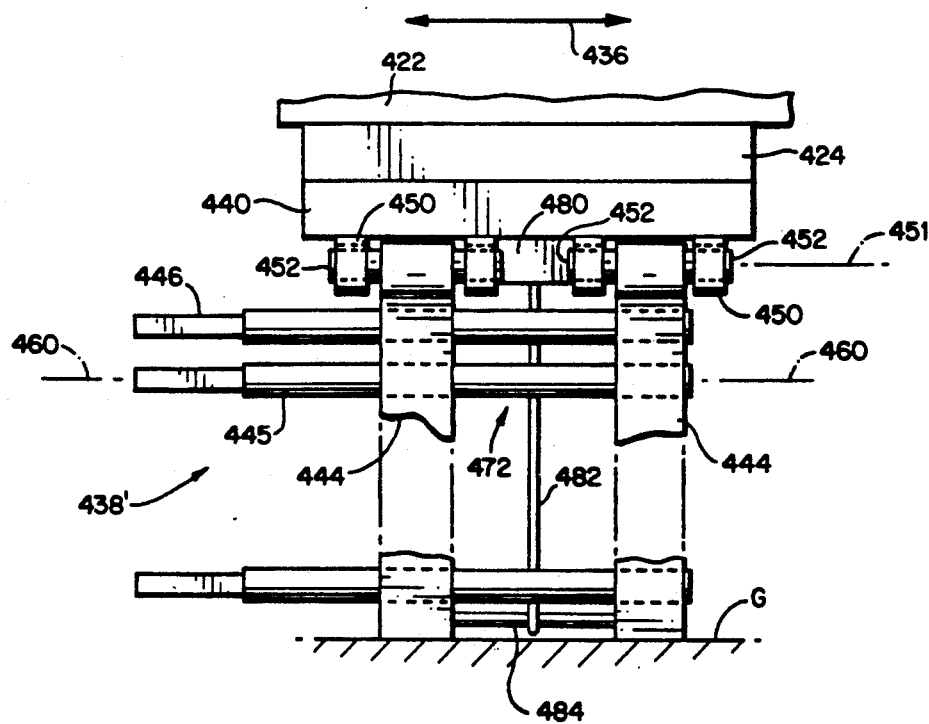
FIG. 15 is a right side view of FIG. 14.

Each of the rungs 445 is essentially cylindrical in shape and has a rung axis 460 (see FIGS. 13 and 15). Each rung 445 has a first (front) end rigidly anchored in the front step supporting member 444. Each rung 445 has an intermediate portion which extends through an aligned aperture in the rear step supporting member 444 and has its second (rear) end protruding from the rear step supporting member 444. Thus, each rung 445 is supported by the two step supporting members 444, with a first end of each rung extending beyond the rear step supporting members 444 and thus slightly beyond the rearmost extent of the vehicle 420.

The rungs 445 are welded or otherwise fixedly fastened to the step supporting members 444. The rungs 445 are stationary with respect to the step supporting members 444.

A step plate 446 is fixedly attached or welded in cantilevered manner to the rear end of each of the rungs 445. The step plate 446 includes a flat surface which, when the step assembly 438 is in its extended position, is oriented to be parallel with the horizontal. Accordingly, with respect to the axis 460 of each rung 445, the rear step supporting member 444 is intermediate the step plate 446 and the front step supporting member 444.

Figure 12:
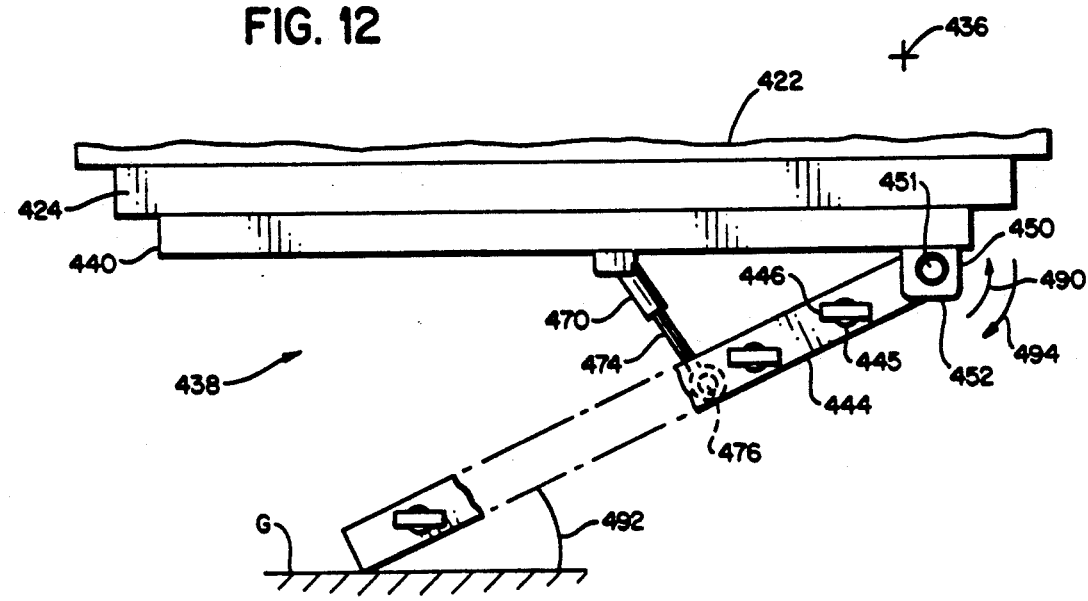
FIG. 12 is a rear view of the step assembly of the embodiment of FIG. 10, with the step assembly including an actuator as a transmission means.

The step assembly 438 also includes transmission means for causing distal ends of the step supporting members 444 to contact the ground and thereby acquire the fully extended position. In the embodiment of FIGS. 12 and 13, the transmission means includes an actuator 470. In the step assembly 438, of the embodiment of FIGS. 14 and 15, the transmission means includes a motor and cable assembly 472.

The actuator 470 of the embodiment of FIGS. 12 and 13 is mounted to the underside of the mounting bracket 440. A distal end of an actuator piston 474 is attached to an intermediate point on a crossbar member 476. The crossbar member 476 is rigidly mounted between the front and rear step supporting members 444. The actuator 470 is electrically controlled by a remote switch, such as a switch positioned in the vehicle cab and connected to the actuator by an unillustrated electrical cable. A further electrical cable is provided to enable the actuator 470 to operate on current supplied by the vehicle battery.

Figure 14:
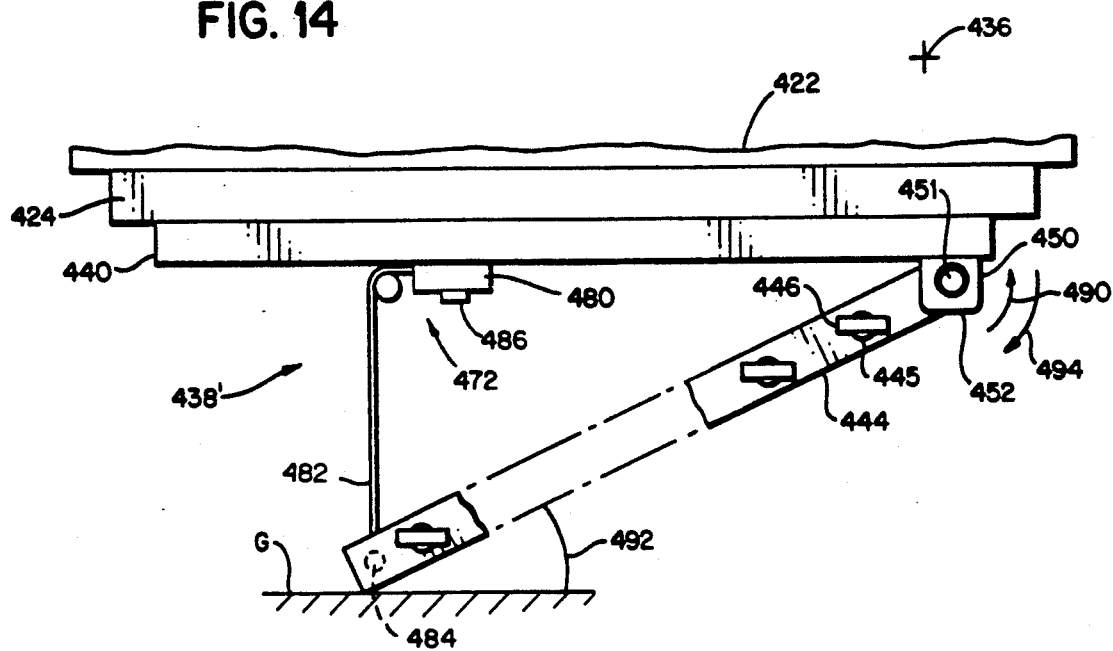
FIG. 14 is a rear view of the step assembly of the embodiment of FIG. 10, with the step assembly including a cable and motor as a transmission means.

The motor and cable assembly 472 of the embodiment of FIGS. 14 and 15 includes an electric motor 480 which is mounted to the underside of the mounting bracket 440. The electric motor 480 is connected to a first end of a cable 482 and is operable to wind and unwind the cable 482. A second end of the cable 482 is connected to a crossbar member 484. The crossbar member 484 is rigidly mounted between the front and rear step supporting members 444 below the lowest (leftmost) step plate 446 (as shown in FIGS. 14 and 15). The electric motor 480 is responsive to a switch 486, which may be located either on the motor 480 or located remotely (as in the vehicle cab and connected to the actuator by an electrical cable). An unillustrated electric cable is provided to enable the electric motor 480 to operate on current supplied by the vehicle battery.

OPERATION

In operation, as the door 26 of vehicle 20 of FIG. 1 is pivoted to its opened position, the cable 64, having its second end connected to the door 26, is pulled in the direction shown by across 90. As the cable 64 is pulled in the direction of arrows 90, the force on the cable 64 overcomes the tension of biasing means 46 and causes the step supporting members 44 to pivot in the counterclockwise sense (shown by arrow 92 in FIG. 1) for extension to an essentially perpendicularly dependent position as shown in FIGS. 2 and 4. In overcoming the tension of biasing means 46, the cable 64 passes over first pulley 68 through the vehicle body 22 via hollow cord 70 along the windshield post 30 to the second pulley 72 through the horizontal section of hollow cord 70 along the top 32 of the vehicle body 22 to aperture 74 and out to the point on the vehicle door 26 where the cable 64 is attached.

The first pulley 68 thus acts to translate essentially horizontal motion of the transmission means into essentially vertical motion. The second pulley 72 operates to translate essentially vertical motion into essentially horizontal motion. The distal ends of the step supporting members 44 thereby descend in a vertical direction (e.g. below the vehicle 20) when in the extended vertical position.

When the vehicle door 26 is pivoted to the closed position, the force formerly applied by cable 64 is relaxed, permitting biasing means 46 to exert its biasing force on step supporting members 44, thereby rotating the step supporting members 44 about axis 51 (which is perpendicular to the longitudinal axis of the vehicle 20) in the clockwise sense as shown by arrow 94 in FIG. 3. The plane of the step thus translates vertically between the retracted and extended positions.

The step assembly 38" of the embodiment of FIG. 6 operates in a similar manner as the embodiment of FIG. 1. However, the biasing means 46" exerts a counterclockwise force on the step assembly 38". Upon opening of the door 26, the cable 64" has forces exerted thereon in the direction of arrows 90" to apply a clockwise rotational force (in the direction of arrow 92") on the step assembly 38".

When the door 26' of the vehicle 20' of the embodiment of FIG. 5 is slid to its opened position, the cable 64' pulls the step supporting members 44' to the extended position against the tension of the biasing means 46'. The cable 64' passes over first pulley 68' through the vehicle body 22' via hollow cord 70' along the windshield post 30' to the second pulley 72' to aperture 74' and out to the point on the vehicle door 26' where the cable 64' is attached. When the vehicle door 26' is slid, moved, pushed, or swung to the closed position, biasing means 46' causes step supporting members 44' to rotate about an axis which is perpendicular to the longitudinal horizontal axis 36' of the vehicle 20'.

For doors which open as sliding doors along a track, it is easier to convert the sliding motion to energy for extending the step assembly. Factors enhancing ease of operation include the fact that people generally use two hands when opening a sliding door, and the fact that the entire force applied to displace the door can be utilized instead of a vectorial component thereof. Hence, a sliding door can be easily coupled to translate the door's movement along the horizontal axis to the step assembly's pivoting about an axis which is perpendicular to the horizontal longitudinal axis of the vehicle.

Thus it is seen the present invention provides a retractable step assembly which is connected to the locking end of a door, as opposed to a hinged end of a door, to ensure that the maximum amount of energy available from opening the door will be used to operate the extension. In addition, the step assembly pivots about an axis which is perpendicular to the longitudinal horizontal axis of the vehicle.

When the door 26''' of the embodiment of FIG. 7 is pivoted to the open position, switch 112 will be in an "on" position, thereby causing activation of the electric motor 110. Activation of the motor 110 causes the cable 64''' to be wound or otherwise pulled about the output shaft of the motor 110, overcoming the bias of biasing means 46''', and thereby pulling the cable 64''' (and thus the step supporting members 44''') in the direction of arrow 90''' until the step assembly 38''' is pivoted to the extended position.

When the vehicle door 26''' is pivoted to the closed position, the output shaft of the electric motor 110 is relaxed or reversed, depending on the type of motor 110 employed, with the result that the biasing means 46''' successfully exerts its biasing force on the step supporting members 44''' to urge the step supporting members 44''' into the retracted position.

Again, it should be understood that the embodiment of the step assembly 38'' of the embodiment of FIG. 7 works in the same manner on a sliding door vehicle as on a hinged door vehicle. Moreover, it should also be understood that the relation of the switch 112 and motor 110 components of the step assembly 38''' can easily be reversed so that, if opening the door 26''' turns off the switch 112, the motor can be made to be responsive to the "off" position of the switch 112 to extend the step assembly 38". For the embodiment of FIG. 7, the extension and retraction of the step assembly is related to the opening and closing of the vehicle door but does not directly depend upon energy exertion of the user. Hence, no additional energy is required to open a door with the step assembly 38''', the assembly 38''' being automatic. For the embodiment of FIGS. 8 and 9, when the vehicle door is opened, switch 112 is opened causing the piston 292 of electric motor 210 to retract. Retraction of piston 292 pivots shaft 286 and the step supporting member 320 in the clockwise direction about the axis of shaft 286. Consequently, the step supporting member 320 is vertically extended. As the step supporting member 320 is vertically extended (e.g., lowered), the step-attachment bar 380 pulls the step 242 into a vertically lowered position shown by solid lines in FIG. 8.

When the vehicle door is closed, the switch 112 is closed causing the piston 292 of the electric motor 210 to extend. Extension of piston 292 pivots shaft 286 and the step supporting member 320 in the counterclockwise direction about the axis of shaft 286. Consequently, the step supporting member 320 is vertically retracted to assume the position shown by phantom lines in FIG. 8. As the step supporting member 320 is vertically retracted (e.g., raised), the step 242 is pushed upwardly. The upward force caused by the vertical elevation of the step supporting member 320 causes the shaft 360 to slide up the aperture 354 provided in the other step supporting member 350.

It should be understood that the embodiment of FIGS. 8 and 9 can also be installed for a rear opening door of a vehicle. In such a configuration, the axes about which the step supporting members 320 and 350 pivot are parallel to the longitudinal axis of the vehicle.

When the switch of the embodiment of FIGS. 10–13 is pressed to extend the step assembly 438 from its retracted position (seen in FIG. 10) to its extended position (seen in FIG. 12), the piston 474 of the actuator 470 is extended to permit the step supporting members 444 (connected to the piston 474 by the crossbar member 476) to pivot in the counterclockwise direction (shown by arrow 490) about the axis 451. When the piston 474 is fully extended, the distal ends of the step supporting members 444 contact the ground G or road upon which the vehicle 420 is parked. Upon full extension of the piston 474, the step supporting members 444 together lie in a plane (out of the sheet of FIG. 12) which is angularly inclined (at angle 492 as shown in FIG. 12) with the ground G.

When the actuator 470 is to raise the step assembly 438 of the embodiment of FIGS. 10–13, the piston 474 is retracted, thereby pivoting the step supporting members 444 upwardly in a clockwise direction (as indicated by arrow 494 in FIG. 12). The step assembly is drawn up beneath the mounting bracket 440 as closely as the actuator 470 will permit, ultimately into the position shown in FIG. 10. The actuator 470 itself can be selectively pivotally mounted underneath the mounting bracket 440 to facilitate snug fitting under the mounting bracket 440.

When the switch of the embodiment of FIGS. 14–15 is pressed to extend the step assembly 438 from its retracted position (seen in FIG. 10) to its extended position (seen in FIG. 11), the motor 480 permits the cable 482 to be unwound by the gravitational weight of the step supporting members 444 (connected to the cable 482 at the crossbar member 484). The step supporting members 444 thereby pivot in the counterclockwise direction (shown by arrow 490) about the axis 451. When the cable 482 is fully unwound, the distal ends of the step supporting members 444 contact the ground G or road upon which the vehicle 420 is parked.

When the motor 480 winds the cable 482 of the embodiment of FIGS. 14–15, the distal ends of the step supporting members 444 are lifted upwardly, with the result that the step supporting members 444 pivot in a clockwise direction (as indicated by arrow 494 in FIG. 14). The step assembly is drawn up beneath the mounting bracket 440 as closely as the motor 480 will permit, ultimately into the position shown in FIG. 10.

If necessary, the embodiment of FIGS. 14 and 15 can be provided with biasing means to bias the step supporting members 444 (at a crossbar thereof) to the mounting bracket 440.

While the invention has been particularly shown and described with reference to the preferred embodiments thereof, it will be understood by those skilled in the art that various alterations in form and detail may be made therein without departing from the spirit and scope of the invention. For example, the step assembly 438 of the embodiments of FIGS. 10–15 can be mounted to service a side door of a vehicle rather than a rear door.

I claim:

1. A step apparatus for a vehicle, the apparatus comprising:

mounting bracket means for attachment beneath the vehicle;

two step supporting members having proximal ends pivotally attached to the mounting bracket means and distal ends, the step supporting members having pivotal movement between a retracted position beneath the vehicle and an extended inclined position subjacent to the vehicle;

a plurality of rungs, each of the rungs having a rung axis and being supported by the two step supporting members, with a first end of each rung extending beyond a first of the step supporting members;

a step plate attached in cantilevered manner to the first end of each of the rungs whereby the first step supporting member is intermediate the step plate and the second step supporting member along the rung axis; and transmission means for causing the distal ends of the step supporting members to contact a ground and thereby acquire the extended position.

2. The apparatus of claim 1, wherein in the extended position the two step supporting members together lie in a plane inclined at an angle with the ground.

3. The apparatus of claim 1, wherein the step plates are oriented to be parallel with the ground when the step supporting members are in the extended position.

4. The apparatus of claim 1, wherein the transmission means is responsive to switch means.

5. The apparatus of claim 1, wherein the transmission means includes an actuator having a first end connected to the mounting bracket means and a second end connected to a bridging member which is connected between the step supporting members.

6. The apparatus of claim 1, wherein the transmission means includes cable means having a first end connected to mounting bracket means and a second end connected to a bridging member which is connected between the step supporting members.

7. The apparatus of claim 1, wherein the step supporting members are parallel and spaced apart.

8. The apparatus of claim 1, wherein the parallel movement of the step supporting members occurs about a horizontal axis which is parallel to a longitudinal horizontal axis of the vehicle, and wherein the step supporting members are attached to the mounting bracket means at attachment points which are spaced along the longitudinal horizontal axis of the vehicle.

* * * * *